Figure 1:
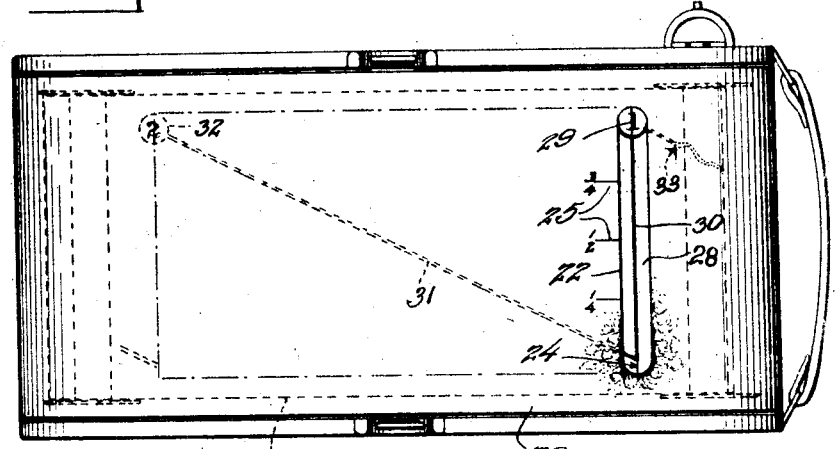

H. G. CUTHBERT.
FILM CAMERA.
APPLICATION FILED JULY 6, 1915.

1,195,187.   Patented Aug. 22, 1916.
3 SHEETS—SHEET 1.

Witnesses

Inventor
H. G. Cuthbert
By H. L. Woodward
Attorney

H. G. CUTHBERT.
FILM CAMERA.
APPLICATION FILED JULY 8, 1915.

1,195,187.

Patented Aug. 22, 1916.
3 SHEETS—SHEET 2.

Witnesses

Inventor
H. G. Cuthbert.
By H S Woodward
Attorney

H. G. CUTHBERT.
FILM CAMERA.
APPLICATION FILED JULY 8, 1915.
1,195,187.
Patented Aug. 22, 1916.
3 SHEETS—SHEET 3.
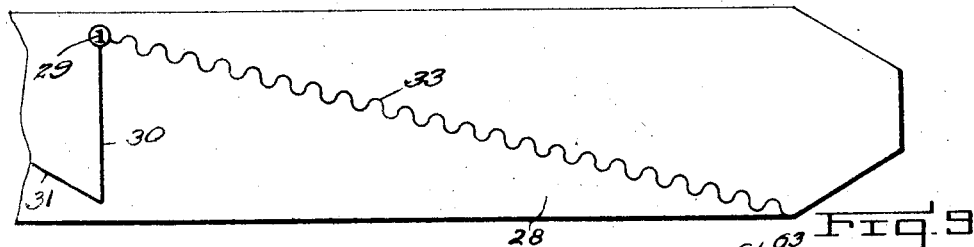
Fig. 9.
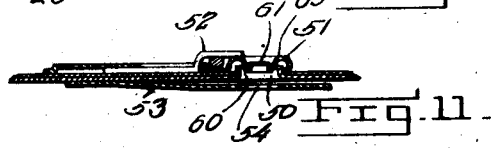
Fig. 11.
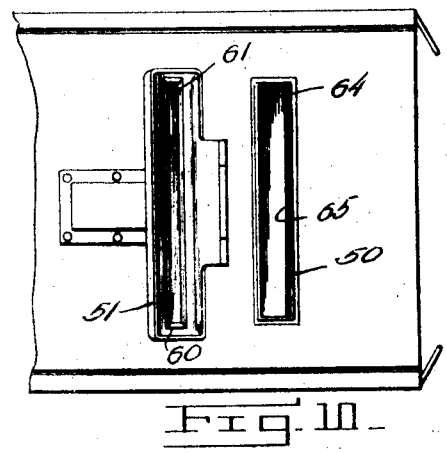
Fig. 10.
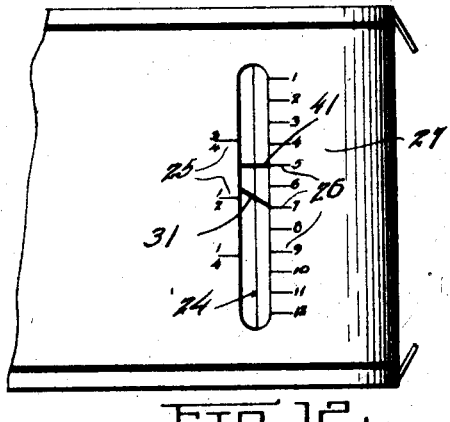
Fig. 12.
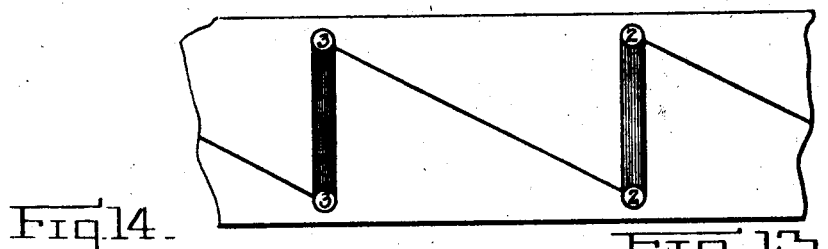
Fig. 14. Fig. 13.
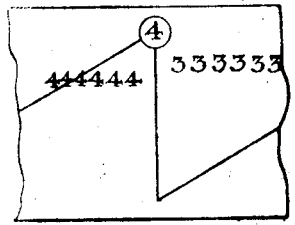
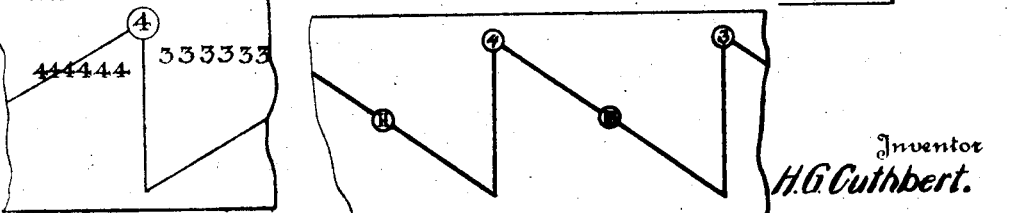
Fig. 15.
Witnesses
Inventor
H. G. Cuthbert.
By H. L. Woodward
Attorney

UNITED STATES PATENT OFFICE.

HERMAN G. CUTHBERT, OF NEWARK, NEW JERSEY.

FILM-CAMERA 1,195,187.　　　Specification of Letters Patent.　　Patented Aug. 22, 1916.

Application filed July 8, 1915.　Serial No. 38,726.

*To all whom it may concern:*

Be it known that I, HERMAN G. CUTHBERT, a citizen of the United States, residing at Newark, in the county of Essex and State of New Jersey, have invented certain new and useful Improvements in Film-Cameras, of which the following is a specification.

The invention has for an object to provide means whereby the operator of a film camera may know at all times the exact position of film sections in course of winding, and which will obviate to a large extent liability of the winding of a film too far after an exposure has been made and a new section of film is to be brought into position for exposure.

In practically all film cameras a spooled film is used having a paper backing, upon the outside of which a series of ordinals are marked at intervals corresponding to standard lengths of film, all at the same distance from the sides of the film, so that they may be viewed through a small circular opening provided in the backs of cameras and covered with a transparent material having the property of absorbing actinic light. The paper backing is much longer than the total length of film on the spool, in order to enable the reloading of the camera in daylight, as is readily understood. After the initial adjustment of the film in the camera a considerable length of the paper backing must be wound past the view opening in the camera before the first ordinal appears, and in order to guard against winding the paper so far as to move this number past this opening, the operator is compelled to watch the view opening very closely, and wind the film slowly, whereby a great deal of time is consumed, and it is an object of my invention to make it possible to safely wind the paper rapidly without fear of the first ordinal being carried past the view opening inadvertently. After one section of film has been exposed, the same caution must be observed in bringing the next film section into position, as a fractional turn of the winding device might carry the ordinal past the view opening without being observed.

It is an advantage of my invention that as each new section of film is moved out of place my invention operates to indicate how far the succeeding film is moved, at any stage, so that uncertainty as to how near the succeeding ordinal is is removed. In the use of the ordinary film when the operator has moved one ordinal from beneath the new opening there is no means of telling what section of film is in course of reeling. It very often happens that the photographer fears that one section of film has been reeled and that an unexposed section is passing the view opening, when such is not the case, and winding of the film is stopped, leaving an exposed section in place before the lens upon which another exposure is subsequently made. Again, it frequently happens that in reeling an exposed film section the ordinal of a new section passes the view opening of the camera without being observed, and the operator being uncertain as to whether this has occurred must continue winding until another ordinal appears, if he wishes to be certain of having displaced the exposed film, resulting in a waste of one film section. The loss from the two last metioned causes is very great among camera users generally, it being the experience of those who make a business of developing films that one in every three has such an error evident thereon. It is therefore a most important object of my invention to give means whereby the camera user may know at any time what parts of a film are adjusted in the field of the lens, without obscuring or interfering with the proper observation of the ordinals marking the divisions of the film.

It is an important aim of the invention to enable its use without change of the usual camera construction and mechanism, materially—in fact the only change in the camera consisting in changing the form of the view opening, the reeling devices being otherwise the same.

It is an advantage of the invention that it enables fractional parts of standard film sections to be wound with certainty, whereby the appliance may be used in connection with any well known device for protecting a part of the film from exposure while in the field of the lens.

Figure 2:
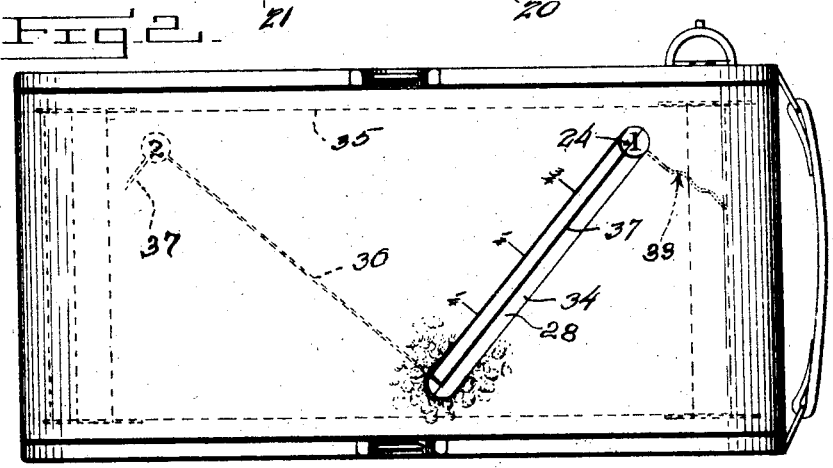
Figure 3:
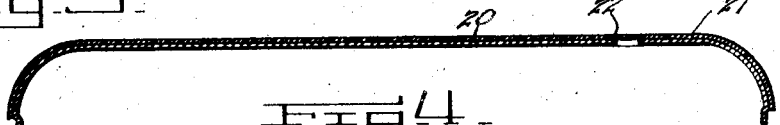
Figure 4:
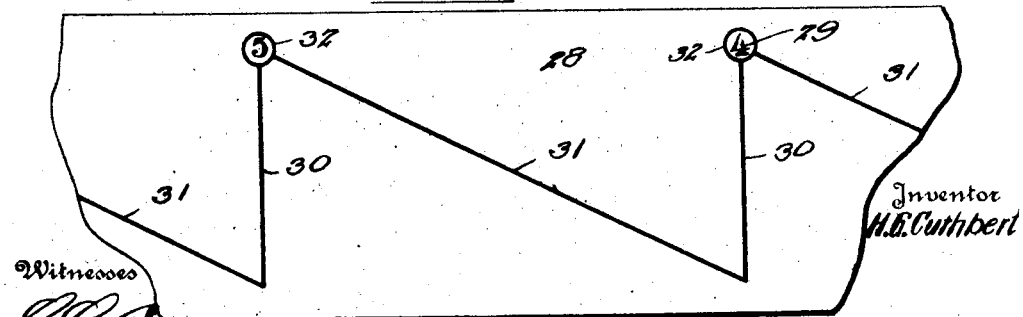
Figure 5:
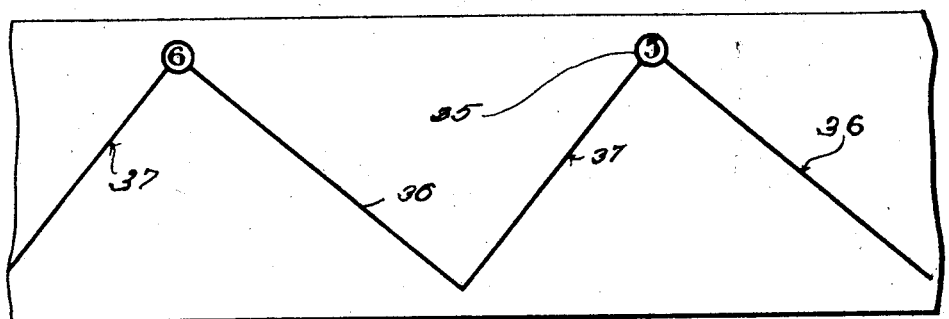
Figure 6:
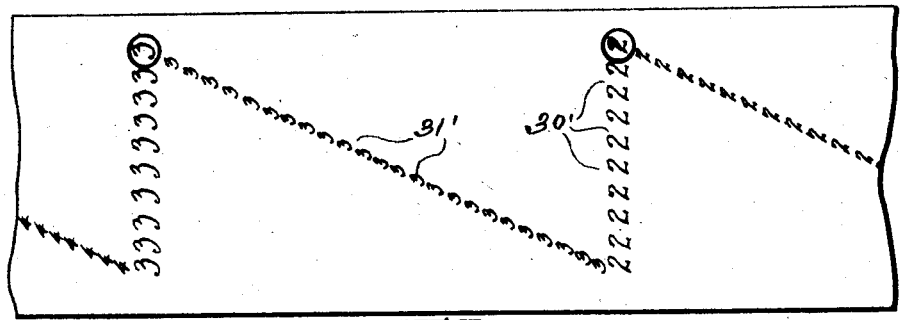
Figures 7, 16:
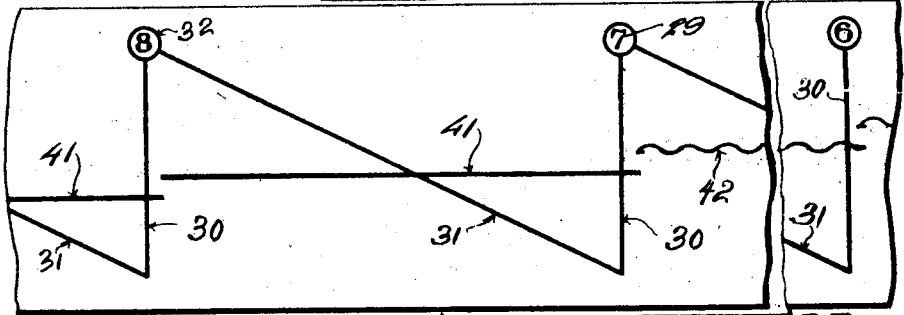
Figure 8:
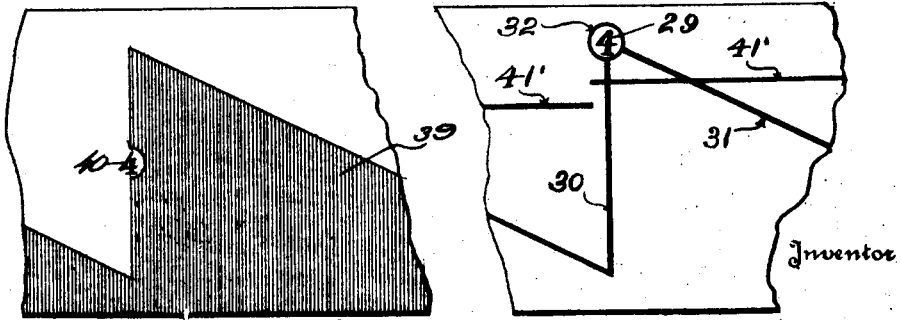

My invention will have utility in various other ways, and additional objects, advantages and features of invention will appear from the disclosure in this application, residing in part in the construction, arrangement and combination of parts hereinafter described and shown in the drawings, in which, Figure 1 is a back view of a camera constructed in accordance with my invention, Fig. 2 is a similar view of a modification of the camera construction, Fig. 3 is a horizontal sectional view of a camera back, Fig. 4 is a fragmentary view of a film backing embodying my invention in part, Fig. 5 is a similar view of a modified form of the invention for use in conjunction with the back illustrated in Fig. 2, Fig. 6 is a similar view of another modification, Fig. 7 is a similar view of a further modification, Fig. 8 is a similar view of a still further modification, Fig. 9 is a similar view showing the projecting end portion of the paper carrying the film, Fig. 10 is an elevation of a camera back embodying an adaptation of my invention to use with a well known type of autographic camera, Fig. 11 is a sectional view thereof, Fig. 12 is an elevation of a camera back having a peculiar scale thereon, Fig. 13 is a plan of a section of backing having a modified arrangement of lines, Fig. 14 is a detail of a modified marking on the paper backing. Fig. 15 is a view of a modified method of marking the paper to indicate both the position of film sections and the remainder of the whole film. Fig. 16 is a view similar to Fig. 6, of an additional modification of the marking of the film backing.

In Fig. 1 there is illustrated a camera back 20 of any familiar form for use with film cameras, the course of the paper backing for the film being indicated by the dotted lines 21. Arranged transversely to the direction of the paper and in line with the point at which the ordinary view opening in such cameras is located there is an elongated window 22, beginning at a point coincident with the ordinary view opening and extending to a point similarly spaced from the opposite side of the paper backing, as indicated, and of a width equal to or slightly less than that of the usual circular opening. The back as illustrated is of a familiar detachable type for film cameras, formed of metal, the opening 22 being punched therein and covered by means of a closure of celluloid or similar material having its edge portions bent inwardly and then outwardly, forming a channel therearound in which the edges of the opening 22 are engaged, the edge portions of the closure being extended inwardly with respect to the back, as shown.

A medial longitudinal line 24 may be formed on this closure in any desired, distinctive way. Beside the opening a scale 25 is formed, reading longitudinally of the opening from left to right when the camera is held in the customary position for rewinding. As shown the scale includes divisions marked "1/4", "1/2", "3/4", but, as will appear, other forms of scales will be useful, depending on the purposes which it is desired to serve, and two or more scales may be employed simultaneously, a scale 26 being shown in Fig. 12 outwardly of the one 25, having divisions marked "1", "2", "3", "4" and so on, up to "12". A greater number of units may be employed, but preferably twelve, are employed as this is a standard number of film units in a cartridge with which the scale is to coördinate. The same scale will also serve in connection with "6-exposure" cartridges, as will appear. These scales may be pressed in the leather covering 27 of the back, or otherwise provided.

In Fig. 4 there is shown a simple form of marking on the paper backing 28 for coöperation with the window described. In the customary positions there are marked the ordinals 29 by which the respective sections of the film in the field are indicated, and vertically from these respective straight lines 30 are extended, the registration of which with the line 24 before mentioned will indicate exact registration of respective film sections with the picture opening within the camera. A diagonal line 31 extends between each two adjacent vertical lines 30, in a direction to intersect therewith at equal distances from the opposite edges of the paper 28. It may not be essential for these lines to intersect, and as shown they stop short at the small circle 32 drawn around the ordinal figure on the paper 28. Otherwise the backing 28 may be the same as that ordinarily employed, and its engagement in the camera is accomplished in the familiar way well understood by those who use such cameras.

When a cartridge having such a backing is engaged in a camera having the form of back 20 described, as one of the ordinals 29 is moved past the window during winding of the film, the diagonal line 31 following will begin to move under the window its intersection with the window moving to the right or downwardly gradually as the film is moved, and indicating accurately by the relation of this intersection to the scale 25 the amount of the film which has been wound at any time, until the succeeding ordinal is brought into registry with the window. The use of the medial line 24 will make the reading more accurate, and also enable the more accurate spacing of the exposures on the film by reason of the ease with which it may be alined with the vertical lines on the paper backing 28.

In Fig. 9 there is illustrated a utilization of the paper backing to guide the operator in the initial winding of the paper after loading. In this case, in advance of the first ordinal 29 on the paper a diagonal serrated line 33 is formed inclined at a more acute angle to the longitudinal medial line of the paper than are the lines 30. When this line is extended beneath the window it will be known that the first film section is not in place and that further winding is necessary before it reaches its position. The amount of paper to be wound before the film is positioned will also be indicated by the height at which the serrated line passes the window.

In order that the intersection of the serial diagonal lines and the window may be at a greater angle, the window may be made so inclined as to attain this to the desired degree, as indicated in Fig. 2, and scales having corresponding divisions may be utilized beside this window as before described, as well as a medial line. The paper strip for use with the window in this position as illustrated in Fig 5 may have ordinals as at 35, similar to those before described, but the diagonal lines 36 corresponding to those 31 have a more acute angle with respect to vertical lines, and are shorter, although extending between points correspondingly near the opposite edges of the paper. The diagonal lines begin at the side opposite the ordinals at points spaced rearwardly of respective ordinals a distance corresponding to the distance which the inner end of the window 34 is spaced from a vertical line at its outer end. From these points of beginning, diagonal lines 37 are extended to the respective ordinals, serving the function of the vertical lines before described, in conjunction with the medial line of the window 34. Thus as each ordinal is brought under the window and the line 37 properly alined, one of the lines 36 will begin to intersect the medial line of the window at right angles, in the arrangement shown, and the amount of film wound will be properly indicated in conjunction with the scale 25.

In Fig. 6 there is illustrated a means whereby the operator may always know what film is being wound into position for exposure, consisting in providing diagonal and transverse lines 31' and 30' formed by arranging a multiplicity of the ordinal numbers in lines of the necessary direction and position, or forming these series of numbers immediately beside the transverse and diagonal lines before described. Thus when a film is brought into registry with the picture opening of the camera, a transverse series of the numbers will be exposed beneath the window, and after reeling of this section is started, a diagonal series of the succeeding ordinal will begin to pass the window indicating what particular film section is being positioned and how much of it has been moved before the window.

In Fig. 8 another method of indicating the passing of the film sections is illustrated, consisting in forming on one side of the paper a solid block of color 39 of a distinctive character, the margin of which has the same contour as the transverse and diagonal lines previously described, in the form preferred. The ordinal figures 40 may be formed in small blank spaces in the block color, or may be printed in a different color, as desired.

In Fig. 7 a desirable method of indicating the number of the passing film is shown, consisting in using in conjunction with either of the previously described arrangements for measuring the film reeled a series of rectilinear longitudinal lines 41, each the length of a film section and positioned so as to extend across the window as long as a respective film section has any portion exposed in the picture opening of the camera. These lines are also individually spaced from one edge of the paper, for coöperation with the scale 26 beside the window, as before mentioned. Thus, the first film section will have a longitudinal line thereon which will register with the first division of the scale; the second section a similar line which will aline with the second division of the scale, and so on, as one line terminates, the succeeding one beginning and the margin of the film sections pass from the picture opening as these line terminals pass the window. In place of plain lines, it is obvious that the principle of the showing in Fig. 6 may be utilized, and the lines formed of a repetition of the ordinal designation of the respective film sections, as at 41ª, in Fig. 14.

In connection with the indication of the number of the film sections by the scale 26, it will be understood that by having twelve divisions on the scale it may be used as well for six and twelve exposure cartridges. If desired, however six divisions only may be used and two sets of the longitudinal lines formed on twelve exposure cartridges, the first series being undulated or otherwise distinguished, as at 42 in Fig. 7.

In Figs. 10 and 11 there is illustrated an application of the invention of great utility in conjunction with the customary construction employed in what is known as the "autographic camera," that is, one so constructed as to permit identifying data to be written or otherwise made on the film. One familiar camera of this kind includes a transverse slot 50 in the back closed by a door 51, spring pressed and tending to open, but held in closed position normally by means of a sliding stop 52. Inwardly of the slot 50 there is a resilient slotted plate 53 arranged to bear lightly against a paper backing passing beneath the slot and having a writing slot 54 therein within which the record is made upon the exposed paper. The usual details of the construction of this camera are well understood by those versed in the art. It has been customary to form this slot at the opposite end of the camera from the circular window through which the film section ordinals are viewed, and the use of both the familiar window construction and the slot and accompanying details have been required. It is possible to utilize this regularly formed slot of the autographic camera as the window for assuring proper adjustment of the film either with or without the supplementary circular window for viewing the ordinals.

In the customary door, its central part is recessed to receive a stylus, retained therein by the sliding stop mentioned, which projects across the door. In my construction I extend the hinge knuckles and so space them outwardly of the door that the stylus may be superposed thereover and held by the stop as before immediately adjacent the hinge instead of in the central part of the door. The central part I cut away as at 60, and in this cut away part I fix the transparent orange colored screen body 61 in the familiar way. The door is formed with a raised edge portion 63 by which the screen is protected.

In case the circular window is eliminated, the slot and screened door are located at the end where the circular window is customarily placed, and the arrangement of the lines on the paper backing is substantially the same as before described, any of the different methods being employed, and it is preferable that the vertical or transverse lines on the backing be so located that they will serve as a bottom or outer guide line for the autographic record which may be written on the film, and will also serve as a guide in case it is necessary to cut the film sections apart before development, as is often desirable. In the latter case the transverse line will insure the autographic record being included on the film section to which it applies and also prevent accidental cutting of the record itself. In this case it may be desirable to locate the ordinals 64 of the film sections to one side of the transverse lines 65 so that they will appear fully in the opening when the lines are located to one side thereof, as illustrated in Fig. 10.

Should the circular window be retained at the same time that the slot for autographing is utilized at the opposite end of the back, and the door having the transparent screen is used for regulating the movement of the film, the ordinals for observation through the regular window would indicate the beginning of film sections, while another set could be provided for observation through the autographic opening, associated with the transverse lines on the paper, as indicated in Fig. 13.

In connection with the scale 26, and coordinated lines on the film backing, it would be possible to omit the special ordinal figures on the backing, entirely, so that in connection with the autographic device, especially, there would be no figures or marks on the backing to confuse the user in making a record.

It would also be of advantage in some cases to form in alinement with the divisions of the film transverse broad bands which will completely fill and aline with the observation window instead of having a narrow line as is also illustrated in Fig. 13. If this broad band is made of light colored pigment and a binder that will allow it to be removed by a stylus or the like it would be especially useful in connection with the autographic camera in making clear exactly what has been written. The broad band of last mentioned material may be used and a fine line also if desired.

In Fig. 15 there is illustrated a method of marking the paper backing to indicate to the user the number of films remaining on a cartridge as each exposed section is wound. This would be especially useful where the user is not aware whether the cartridge with which the camera is loaded is one having six, ten or twelve exposures. This method consists in forming indexes intermediately of either the diagonal or the longitudinal lines before described, (the illustration showing the index in a diagonal line).

There are of course various methods by which such information may be conveyed, but preferably Roman characters are used for this purpose and Arabic characters for ordinals of the film sections, or other distinct means employed.

The medial line on the covering of the observation opening may be termed a sight element, but the sides of the opening may be used for alinement of the transverse lines on the paper, and the outer edge of the slot 54 may be and is preferably used for the purpose, so that the term sight element may include these last named elements also.

I do not regard my invention limited to the specific details, and it is understood that various equivalent elements in the same relation are comprehended within the scope of the claims hereto appended. The diagonal, transverse, and longitudinal lines may be termed index elements, since they serve functions bringing them within that designation.

By the arrangement of lines in Fig. 6, the order of an exposed film section being wound onto the spool will be indicated. It may be desired, however, to indicate, as an exposed film section is being removed, the number of the new and unexposed section which may be thereby brought into position for exposure in the camera. This may be done by the arrangement shown in Fig. 16, where corresponding horizontal lines 41' may be used as before, except that they begin just behind the vertical lines 30 or corresponding line, and at their rear ends intersect the transverse line indicating the beginning of another film section. With the arrangement in Fig. 6 the line 41 or 42 registering with the sixth division of the scale 26, for instance, will be coextensive with and behind the sixth section of the film, and at the beginning intersects the line 30. Under the arrangement in Fig. 16, the line registering with the sixth division of the scale 26 will be behind the fifth section of the film and at its rear end intersects the line 30.

What is claimed.

1. The invention including a web to be reeled, a housing element therefor including a portion lying closely thereagainst and having an observation opening therethrough of elongated form extending across the major part of the width of the web, and a diagonal index means on the web arranged with relation to the observation opening to intersect the same and under reeling of the web to intersect the window at points having a distinct relation to the positions of the web.

2. A device including a housing, a web to be reeled, an observation opening being formed in the housing extending across the width of the web closely thereadjacent, a scale marked beside the opening, and diagonal index means on the web arranged to intersect the opening at progressively varied points under reeling of the web and having a peculiar angle to the longitudinal medial line of the web related to said scale.

3. Means for constantly indicating the number of a film section in course of reeling and the length of film wound at any time, comprising a housing element, a web, means to guide the web thereadjacent in a fixed path, an elongated observation opening being formed in the housing element extending across the path of the web, diagonal elements on the web constructed to indicate by the point of their intersection with the opening the position of the web, individual indices adjacent respective film sections spaced progressively increased distances from one side of the web, and a scale beside the opening coördinated with the said indices to indicate the significance of registered indices.

4. Means to constantly indicate the number of a film section being wound and the position of the film, comprising a housing element, a web to be reeled, an elongated observation opening being formed in the housing element extending across the path of the web, individual ordinal indices on the web positioned to register with said opening as respective film sections are positioned for exposure, and diagonal series of repeated ordinals on the web corresponding to adjacent respective sections.

5. In a device of the character indicated a housing element, a web, means to guide the web in a fixed path closely adjacent the housing element, an observation opening being formed in the housing element, a sight element associated therewith extending across the path of the web, and index elements on the web constructed to co-act with the sight element.

6. In a device of the character described a housing element, a web, means to guide the web in a fixed path closely adjacent the housing element, an observation opening being formed in the housing element, a linear sight element associated therewith extending across the path of the web, diagonal elements on the web, and a scale formed beside the opening coördinated with the diagonal elements and the sight element in their angular relation.

7. In a device of the character described a housing element, a web, means to guide the web in a fixed path closely adjacent the housing element, an observation opening being formed in the housing element, a scale formed on the housing element beside the opening and a multiplicity of longitudinally extending index elements on the web at successively increased distances from one side of the web in coördination with the scale for the purpose described.

8. A device of the character indicated comprising a housing element, a web, means to guide the web in a fixed path closely adjacent the housing element, an observation opening being in the housing element intermediately of the path of the web, means on the web to indicate the order of respective sections of the web as moved past a given point, positioned to be observed through said opening in synchrony with such movement, and means to indicate the remaining number of sections coincidently with the passage of respective sections by a given point.

9. A device of the character indicated comprising a housing element, a web, an elongated observation opening being formed in the housing element intermediately of the path of the web, diagonal elements on the web, a scale formed on the housing element adjacent the opening constructed to indicate by relation thereto of the diagonal elements the position of respective film sections, and a diagonal element having a different angular relation to the longitudinal medial line of the web in advance of the first named diagonal elements.

10. In a camera of the character indicated a film guide, a housing element adjacent the path of the film to be used, a web, index means thereon spaced transversely in peculiar relation to respective sections of the web, an elongated observation opening being formed in the housing element extending across the major part of the width of the path of the film, and a screen element of the character indicated over the opening.

11. A device of the character described comprising a housing element, a web, means to guide the web in a given path adjacent the housing element, an observation opening being formed in the housing element intermediately of the path of the web, a sight element associated with the opening, individual diagonal elements on the web positioned to indicate by their relation to the sight element positions of respective sections, and a distinguished index element having a relation to the sight element to indicate the length of the whole web on a given side of the sight element.

12. A housing element, a web, means to guide the web in a fixed path adjacent the housing element, an observation opening being formed in the housing element, a sight element associated therewith in the form comprising a transparent element having a sight line thereon at a considerable angle to the direction of the web, elements on the web coördinated with the said line to indicate the progressive changes of position of the web, and lines on the web positioned to aline with the first mentioned line when respective sections of the web are in predetermined position.

13. A camera including a housing element, a web, means to guide the web in a predetermined path with relation thereto, a slot being formed in the housing element transversely of said path, a closure therefor, a sight element thereunder, diagonal index elements associated with the sight element for the purpose described, and transverse lines positioned to aline with said sight element when respective sections of the web are in a predetermined position, and to serve as a guide for marking on the web and cutting thereof.

14. A camera including a housing element, a web, means to guide the web in a predetermined path adjacent the housing element, a slot being formed in the housing element transversely of the path, a closure therefor, a sight element under the slot, and transverse lines on the web to mark the outer margins of web sections in one direction, and to aline with said sight element when respective sections are in a predetermined position, and for the other uses described.

In testimony whereof I have affixed my signature in presence of two witnesses.

HERMAN G. CUTHBERT.

Witnesses:
Wm. H. Pierson
A. B. Holbrook.